Aug. 28, 1956     C. H. COLM     2,760,813
SAFETY ARMREST AND SEAT-BACK BLOCKING STRUCTURE FOR VEHICLES
Filed Oct. 14, 1955
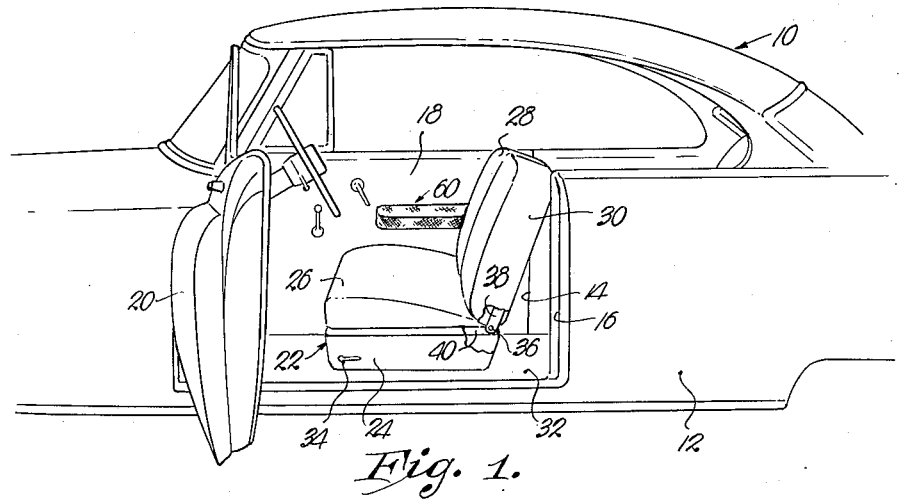
INVENTOR.
Claus H. Colm
BY
ATTORNEY.

United States Patent Office 2,760,813
Patented Aug. 28, 1956

2,760,813

SAFETY ARMREST AND SEAT-BACK BLOCKING STRUCTURE FOR VEHICLES

Claus H. Colm, Falls Church, Va.

Application October 14, 1955, Serial No. 540,584

4 Claims. (Cl. 296—44)

This invention relates generally to the field of motor vehicles and, more particularly, to combination arm rest and back cushion retaining structure especially adapted for use in automobiles of the two-door coach, convertible, or "hard top" varieties having front and rear seats, the former of which are provided with swingably mounted back cushions.

In vehicles of the type to which this invention is particularly applicable, the back rest cushion part of the front seat assembly is normally divided into left and right back cushions each of which is separately, swingably mounted on the base of the seat to permit shifting thereof during entry of a passenger to the rear seat of a vehicle of his departure therefrom. Such swingable back cushions are necessarily of relatively heavy construction having a considerable amount of inertia, and are usually mounted for relatively easy swinging movement in order to facilitate their shifting to permit ingress to and egress from the rear seat of the vehicle. As a result, such back cushions become a potentially dangerous instrumentality when the vehicle is involved in an accident or otherwise compelled to stop or decelerate quickly or without warning, the heavy back cushion operating in such circumstances to propel or give added impetus of a passenger sitting in front thereof on the front seat of the vehicle toward the dashboard, windshield, and other parts of the vehicle which may injure him upon abrupt and forceful contact therewith. In other cases, and even where a passenger is able to prevent himself from being thrown upon the dashboard or windshield, the rear cushion of the seat behind him oftentimes swings forward and, through forceful and unexpected impact, produces serious neck, back or internal injuries.

Accordingly, it is the primary object of this invention to provide safety structure for preventing such undesired forward swinging movement of the rear cushion of a vehicular front seat during accidents or the like.

It is another important object of this invention to provide such safety structure which may be inconspicuously and attractively implaced and which is of nature having a dual utility in that it may also serve as an arm rest for the passenger sitting on the adjacent seat.

Another important object of this invention is to provide such structure which may be mounted on a door of the vehicle adjacent the seat being rendered safe thereby, so that the structure will be automatically swung away from the corresponding back cushion to clear the latter for forward swinging movement permitting ingress and egress of passengers to and from the rear seat of the vehicle when such door is open.

Another important object of this invention is to provide such safety structure which may be shiftably mounted upon the door of the vehicle for adjustment of its position in accordance with the particular position to which the front seat of the vehicle may be shifted by the driver for his comfort and convenience.

Another important object of this invention is to provide such structure including rigid parts in both the back cushion and cushion stopping portions thereof to insure a positive block against undesired, forward swinging of the back cushion.

It is a still further important object of this invention to provide such structure which will normally have its rear extremity actually in overlapping engagement with a portion of the rear cushion being blocked to prevent any appreciable forward movement of such rear cushion when the door of the vehicle is closed.

Still other important objects of the invention, including certain significant details of construction, will be made clear or become apparent from the accompanying drawing and the description of the invention which follows.

In the accompanying drawing:

Fig. 1 is a fragmentary, perspective view of a portion of an automobile having the safety structure contemplated by this invention included therein;

Fig. 2 is a fragmentary top plan view of a portion of the door, seat and safety arm rest structure utilized in the automobile of Fig. 1, parts being broken away and shown in section for clarity of illustration;

Fig. 3 is a perspective view of one embodiment of a combination arm rest and back cushion retaining structure of the invention per se; and Fig. 4 is a fragmentary perspective view of a portion of a door of a vehicle showing the means for shiftably mounting thereon a safety arm rest and rear cushion blocking structure of the type illustrated in Fig. 3.

The numeral 10 in the accompanying drawing generally designates a two-seated automobile having a hollow body 12 provided with a pair of opposed door openings 14 and 16 and a pair of opposed doors 18 and 20 swingably mounted on body 12 for alternately opening or closing door openings 14 and 16 respectively. A front seat assembly generally designated 22 extends laterally of the body 12 between door openings 14 and 16 and includes a base 24, a bottom cushion 26, and a pair of back cushions 28 and 30. Base 24 is shiftably mounted upon the floor 32 of body 12 by adjustable means including and represented in the drawing by a latching lever 34 normally situated on the driver's side of the base 24. Each of the back cushions 28 and 30 is mounted in similar fashion upon the base 24 by means of pivotal connections as at 36 between rigid structural frame members as at 38 forming a part of each of the back cushions 28 and 30 and rigid structural frame members as at 40 forming a part of the base 24. Pivotal means 36, which are adjacent the rearmost extremity of the bottom cushion 26 and the lowermost extremities of the back cushions 28 and 30, obviously mount the cushions 28 and 30 for forward swinging movement relative to the remainder of assembly 22 and the body 12 about a substantially horizontal axis extending through the pivotal means 36 and along the lowermost extremities of the cushions 28 and 30.

The door 18 will conventionally be provided with a latching handle as at 42 for opening the same, a glass window 44 and a metallic inner panel 46 below the opening provided for viewing through window 44. Panel 46 is, if this invention is embodied in the automobile 10 during initial manufacture thereof, preferably provided with an integral, flat, plate portion 48 having an elongated substantially horizontal slot 50 therein provided with a plurality of equally spaced, downwardly extending notches 52 communicating therewith. Where this invention is to be incorporated in the vehicle 10 after initial manufacture thereof an elongated aperture 54 may be cut in panel 46 and a separate plate 48 mounted thereon by any suitable fastening means 56, as is illustrated in the drawing. As indicated, particularly in Fig. 4, the panel 46 is preferably covered by any suitable decorative fabric as at 58.

The combination safety arm rest and back cushion retaining structure of the invention is generally designated by the numeral 60 and includes a rigid, metallic frame 62 within which is provided a quantity of resilient cushioning material 64 covered by a fabric covering 66. The frame 62 may be of various shapes and configurations provided that same includes a rearmost portion 68 adapted to extend laterally away from the panel 46 a substantial distance sufficient to positively overlap an adjacent portion of the proximate back cushion 28 (or 30) when the door 18 (or 20) is closed and the structure 60 is mounted on the latter in the manner to be described. In the preferred embodiment illustrated, portion 68 is slightly, concavely arcuate to substantially complement the curvature of the back cushion 28 (or 30); it is found that this construction best permits the desired engagement between structure 60 and cushion 28 (or 30) when door 18 (or 20) is closed, without any binding therebetween as the door 18 (or 20) is being opened or closed. It is also important to the preferred form of the invention that each of the back cushions 28 and 30 include as a part of its structural frame a rigid metallic member 70 disposed about the edge thereof adjacent the proximate door 18 or 20 and at a level for abutting against (except for the intervening fabric cover 66 on assembly 60 and a fabric cover 72 on the back cushion 28 or 30) against the rearmost portion 68 of rigid frame 62 of assembly 60. Member 70 should be slightly, convexly arcuate to complement the curvature of portion 68, it being noted that, with such construction, any forward force applied by back cushion 28 (or 30) to cushion 60 tends to wedge the rear of the latter even more tightly toward the door 18 (or 20).

For convenience in manufacturing, the frame 62 is preferably interrupted as at 74 and 76, the gap thus presented being bridged by an elongated, rectangular, rigid metallic mounting plate 78 rigidly secured to the frame 62 by fastening means 80 and 82.

The mounting plate has secured thereto and extending from the exposed face thereof a plurality of T-shaped lugs generally designated 84. It is significant that there are a lesser number of lugs 84 than there are notches 52 in slot 50. Each of the lugs 84 includes a rectilinear base portion 86 secured to plate 78 in any suitable fashion as by a rivet type coupling 88, and a normally horizontal, elongated, rectilinear cross portion 90 spaced from plate 78 a distance substantially equal to but slightly greater than the thickness of the plate 48 of door 18 (or 20).

As will be particularly clear from Fig. 2, the lugs 84 are adapted to pass freely through or be slid along the upper straight portion of slot 50 in plate 48 and thereby received and releasably held by any corresponding plurality of the notches 52, the base portions 86 of the lugs 84 fitting snugly but releasably within the notches 52 and the cross portions 90 of lugs 84 engaging innermost face of the plate 48. The structure 60 may thus be easily and conveniently installed on the door 18 (or 20) and may thereafter be shifted relative to the plate 48 and said door by lifting the same upwardly, moving it to a position where the rearmost extremity of structure 60 will engage and overlap the forwardmost outer portion of the back cushion 28 (or 30) and then lowering the structure 60 to position lugs 84 within notches 52. It should be observed that the upper, straight portion of slot 50 is preferably of width sufficient only to just clear the lugs 84 for insertion therethrough, and that the fit between lugs 84 and the notches 52 of plate 48 should be relatively snug. Particularly when these constructional conditions are met, it is found that any forward force exerted upon the structure 60 by the back cushion 28 (or 30) will operate only to wedge the structure 60 more firmly into its established positioning relative to plate 48, rather than exhibiting any tendency to displace the structure 60 from the plate 48 or any given position therein.

It will now be apparent that the structure contemplated by this invention, as exemplified by the embodiment just described for purposes of illustration, is ideally suited to accomplishing all of the above-mentioned and other objectives of the invention. It will be equally manifest, however, that certain minor modifications and changes could be made, particularly with respect to the means for mounting the structure 60 on the door 18 (or 20), without departing from the true spirit or intention of the invention. Accordingly, it is to be understood that the invention should be deemed limited only by the scope of the claims that follow.

Having thus described the invention, what is claimed as new and desired to be secured by Letters Patent is:

1. In a motor vehicle, a hollow, passenger accommodating body having at least one opening in a side thereof for ingress and egress of passengers; a door swingably mounted on the body for movement between a position closing said opening and a position clearing said opening; a seat within the body including a base, a bottom cushion assembly on the base and at least one back cushion swingably mounted on the base for forward and rearward movement about a substantially horizontal axis transverse to the body and adjacent the rear of said bottom cushion and the bottom of said back cushion; and combination arm rest and safety back cushion retaining structure comprising an elongated, padded assembly, and means mounting said assembly on said door and within the body with the rearmost end of the assembly disposed for overlapping engagement with said rear cushion when the door is in its closed position, said assembly being swingable with said door to a position clearing said rear cushion when the door is in its opened position.

2. In the invention as set forth in claim 1, wherein each of the rear cushion and the assembly are respectively provided with a frame member rigid thereto at the zone of overlapping engagement therebetween.

3. In the invention as set forth in claim 1, wherein said base of the seat is adjustably shiftable within limits relative to the body, and said means mounting the assembly on the door is adjustable for maintaining the rearmost end of the assembly in overlapping engagement with the rear cushion whenever the door is in its closed position, regardless of the position to which said base is shifted.

4. In the invention as set forth in claim 3, wherein said means includes an elongated, substantially horizontal slot in the door provided with a plurality of downwardly extending, equally spaced notches therein, and a lesser plurality of equally spaced, T-shaped lugs on the assembly releasably receivable by the slot and any corresponding plurality of adjacent notches thereof.

References Cited in the file of this patent

UNITED STATES PATENTS

| 1,892,048 | Genung | Dec. 27, 1932 |
| 2,559,548 | Seigneur | July 3, 1951 |
| 2,624,613 | Parmely | Jan. 6, 1953 |
| 2,732,003 | Williams | Jan. 24, 1956 |

FOREIGN PATENTS

| 161,460 | Switzerland | July 17, 1933 |